US010853377B2

(12) United States Patent
Zhan et al.

(10) Patent No.: US 10,853,377 B2
(45) Date of Patent: Dec. 1, 2020

(54) SEQUENTIAL DATA ASSIMILATION TO IMPROVE AGRICULTURAL MODELING

(71) Applicant: THE CLIMATE CORPORATION, San Francisco, CA (US)

(72) Inventors: Wang Zhan, Santa Clara, CA (US); John Gates, Alameda, CA (US)

(73) Assignee: THE CLIMATE CORPORATION, San Francisco, CA (US)

( * ) Notice: Subject to any disclaimer, the term of this patent is extended or adjusted under 35 U.S.C. 154(b) by 241 days.

(21) Appl. No.: 15/814,321

(22) Filed: Nov. 15, 2017

(65) Prior Publication Data

US 2019/0147094 A1    May 16, 2019

(51) Int. Cl.
*G06F 17/30* (2006.01)
*G06F 16/2458* (2019.01)
(Continued)

(52) U.S. Cl.
CPC .......... *G06F 16/2474* (2019.01); *A01B 79/02* (2013.01); *A01G 22/00* (2018.02);
(Continued)

(58) Field of Classification Search
None
See application file for complete search history.

(56) References Cited

U.S. PATENT DOCUMENTS 6,262,002 B1 *  7/2001 Carey ................. C05C 5/04
                                              510/110
9,128,494 B2 *  9/2015 Viera .................. A01G 25/16
                         (Continued)

OTHER PUBLICATIONS

Pan, Ming, et al. "A multiscale ensemble filtering system for hydrologic data assimilation. Part I: Implementation and synthetic experiment." Journal of Hydrometeorology 10.3 (2009): 794-806.
(Continued)

*Primary Examiner* — Hung D Le
(74) *Attorney, Agent, or Firm* — Hickman Palermo; Becker Bingham LLP

(57) ABSTRACT

In an embodiment, a computer-implemented method of assimilation of soil moisture data is disclosed. The method comprises receiving, by a processor, a digital data model related to soil moisture with a plurality of parameters for a given geographical location. The method also comprises identifying a time-based or event-based trigger for a first of the plurality of parameters. The method further comprises receiving, by the processor, a plurality of values for the plurality of parameters measured from soil samples for a series of time points. Finally, the method comprises applying sequential data assimilation through the series of time points as soon as the plurality of measured values are received for each of the series of time points, by executing an optimization method to optimize values of the plurality of parameters with respect to the plurality of measured values for each of the time points, thereby obtaining a plurality of optimized values for the plurality of parameters for each of the time points, when the time-based or event-based trigger is satisfied for one of the series of time points, reducing the search space associated with the first parameter in executing the optimization method.

20 Claims, 13 Drawing Sheets

(51) Int. Cl.
*G06F 17/10* (2006.01)
*G06F 9/54* (2006.01)
*G06F 7/02* (2006.01)
*A01G 22/00* (2018.01)
*G06F 16/2453* (2019.01)
*A01B 79/02* (2006.01)

(52) U.S. Cl.
CPC ............... *G06F 7/02* (2013.01); *G06F 9/542* (2013.01); *G06F 16/24547* (2019.01); *G06F 17/10* (2013.01)

(56) References Cited

U.S. PATENT DOCUMENTS

| | | |
|---|---|---|
| 2002/0002633 A1 | 1/2002 | Colling, III |
| 2003/0083819 A1 | 5/2003 | Rooney et al. |
| 2011/0022717 A1* | 1/2011 | Nagai ............... H04L 49/90 709/231 |
| 2013/0131875 A1* | 5/2013 | Viera ............... A01G 25/16 700/284 |
| 2014/0165713 A1 | 6/2014 | Frey |
| 2015/0347647 A1 | 12/2015 | Osborne |
| 2017/0044073 A1* | 2/2017 | Ouadday ............... C05C 1/00 |
| 2017/0161627 A1* | 6/2017 | Xu ............... G06N 7/005 |
| 2017/0169523 A1 | 6/2017 | Xu et al. |
| 2017/0270624 A1* | 9/2017 | Rooney ............... E21B 41/00 |

OTHER PUBLICATIONS

Scharnagl et al., "Inverse modelling of in situ soil water dynamics: Investigating the effect of different prior distributions of the soil hydraulic parameters", dated 2011, 17 pages.

Schapp et al., "Rosetta: A computer program for estimating soil hydraulic parameters with hierarchical pedotransfer functions." Journal of hydrology 251.3 (2001): 163-176.

Shi, Yuhui. "Particle swarm optimization: developments, applications and resources." evolutionary computation, 2001. Proceedings of the 2001 Congress on. vol. 1. IEEE, 2001.

Snyder, Chris, et al. "Obstacles to high-dimensional particle filtering." Monthly Weather Review 136.12 (2008): 4629-4640.

Soil Survey Staff, Natural Resources Conservation Service, United States Department of Agriculture. Web Soil Survey. http://websoilsurvey.nrcs.usda.gov/. Accessed Jun. 29, 2016, 3 pages.

Van Genuchten, M. Th. "A closed-form equation for predicting the hydraulic conductivity of unsaturated soils." Soil science society of America journal, 44.5 (1980): 892-898.

Vrugt, Jasper A., et al. "A Shuffled Complex Evolution Metropolis algorithm for optimization and uncertainty assessment of hydrologic model parameters." Water Resources Research 39.8 (2003). 18 pages.

Moradkhani, Hamid, et al. "Uncertainty assessment of hydrologic model states and parameters: Sequential data assimilation using the particle filter." Water Resources Research 41.5 (2005), 18 pages.

The International Searching Authority, "Search Report" in application No. PCT/US18/60984, dated Feb. 6, 2019, 8 pages.

Current Claims in application No. PCT/US18/60984, dated Feb. 2019, 4 pages.

Muneender, E., and D. M. Vinodkumar. "A new Hybrid Fuzzy Dynamic Velocity Feedback PSO for non-convex economic dispatch problem", 2012 IEEE Conference, 6 pages.

Evers et al. "Regrouping particle swarm optimization: a new global optimization algorithm with improved performance consistency across benchmarks", Systems, Man and Cybernetics, 2009. SMC 2009, 8 pgs.

Giard, D., and E. Bazile. "Implementation of a new assimilation scheme for soil and surface variables in a global NWP model." Monthly weather review 128.4 (2000): 997-1015.

Gordon, Neil J., David J. Salmond, and Adrian FM Smith. "Novel approach to nonlinear/non-Gaussian Bayesian state estimation." IEE Proceedings F-Radar and Signal Processing. vol. 140. No. 2.1993, 7pgs.

J. Kennedy and R. Eberhart, "Particle swarm optimization," Neural Networks, 1995. Proceedings., IEEE International Conference on, Perth, WA, 1995, pp. 1942-1948.

Kumar, Praveen. "A multiple scale state-space model for characterizing subgrid scale variability of near-surface soil moisture." IEEE Transactions on Geoscience and Remote Sensing (1999): 182-197.

M. Clerc and J. Kennedy, "The particle swarm: Explosion, stability, and convergence in a multi-dimensional complex space", IEEE Trans. Evol. Comput., vol. 6, pp. 58-73, 2002.

Mahfouf, Jean-François. "Analysis of soil moisture from near-surface parameters: A feasibility study." Journal of applied meteorology 30.11 (1991): 1534-1547.

Eicker et al. "Calibration/data assimilation approach for integrating GRACE data into the WaterGAP Global Hydrology Model (WGHM) using an ensemble Kalman filter: first results", 2014): 1285-1309.

Mualem, Yechezkel. "A new model for predicting the hydraulic conductivity of unsaturated porous media." Water resources research 12.3 (1976): 513-522.

Willsky, Alan S. "Multiresolution Markov models for signal and image processing." Proceedings of the IEEE 90.8 (2002): 1396-1458.

The International Bureau of WIPO, "International Preliminary Report on Patentability" in application No. PCT/US2018/060984, dated May 19, 2020, 6 pages.

Current Claims in application No. PCT/US2018/060984, dated May 2020, 4 pages.

* cited by examiner

Fig. 2
(a)
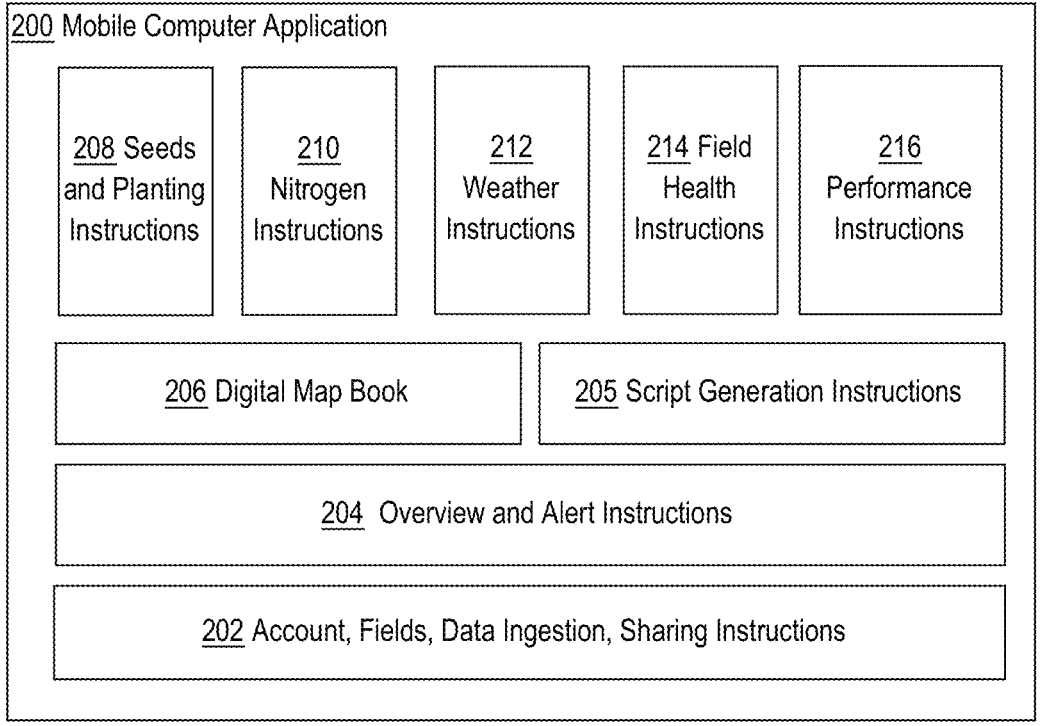
(b)
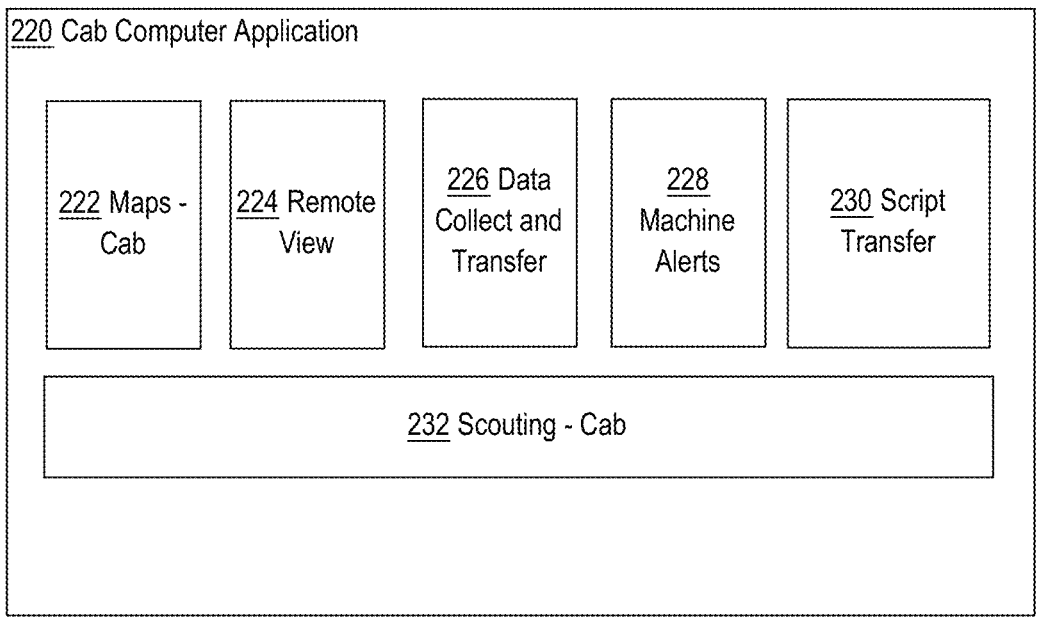

FIG. 5

Data Manager

| Nitrogen | Planting | Practices | Soil |

| Planting 1(4 Fields) | Planting 2(0 Fields) | Planting 3(0 Fields) | Planting 4(1 Fields) | + |
| --- | --- | --- | --- | --- |
| Crop Corn Product | Crop Corn Product | Crop Corn Product | Crop Corn Product | Add New |
| Plant Date: 2016-04-12 | Plant Date: 2016-04-15 | Plant Date: 2016-04-13 | Plant Date: 2016-04-13 | Planting Plan |
| ILU 112 \| Pop: 34000 | ILU 83 \| Pop: 34000 | ILU 83 \| Pop: 34000 | ILU 112 \| Pop: 34000 | |
| [Edit] [Apply] | [Edit] [Apply] | [Edit] [Apply] | [Edit] [Apply] | |

| | CROP | PLANTED ACRES | PRODUCT | RELATIVE MATURITY | TARGET YIELD | POPULATION(AVG) | PLA |
| --- | --- | --- | --- | --- | --- | --- | --- |
| ☐ Select All | | | | | | | |
| ☐ Ames, IA 1<br>Corn \| 100 \| Boone, IA | Corn | — | DMC82-M | 112 | 160 | 34000 | Apr |
| ☐ Austin, MN 1<br>Corn \| 100 \| Fredricks, MN | Corn | — | DMC82-M | 114 | 160 | 36000 | Apr |
| ☐ Boone, IN 1<br>Corn \| 100 \| Boone, IA | Corn | — | DMC82-M | 112 | 150 | 34000 | Apr |
| ☐ Champaign 1<br>Corn \| 100 \| Champaign, IL | Corn | — | — | 112 | 200 | 34000 | Apr |
| ☐ E Nebraska 1<br>Corn \| 100 \| Burt, NE | Corn | — | — | 112 | 160 | 34000 | Apr |

*FIG. 6*

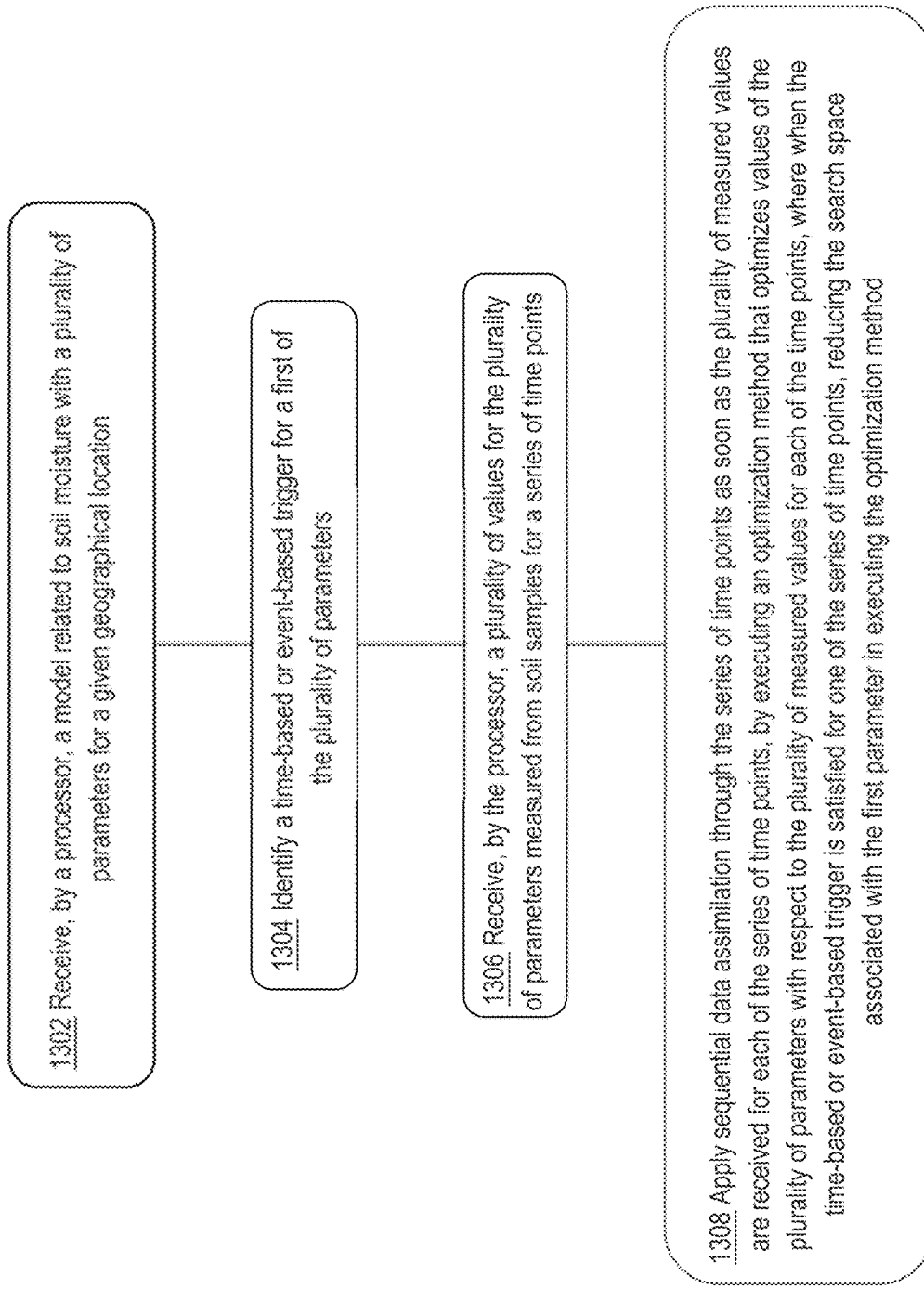

SEQUENTIAL DATA ASSIMILATION TO IMPROVE AGRICULTURAL MODELING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2017 The Climate Corporation.

FIELD OF THE DISCLOSURE

The present disclosure relates to the technical area of data assimilation and more specifically to the technical area of computationally efficient performance of sequential data assimilation to improve agricultural modeling.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Soil moisture plays a key role in surface and subsurface hydrology by affecting various physical processes, including soil water retention, infiltration, evapotranspiration, or run-off, as well as soil nutrient dynamics. Accurately simulating soil moisture is a prerequisite for accurately simulating soil nutrient and, ultimately, providing recommendations for application of nitrogen or other nutrients to growing fields.

Near surface soil moisture observations can provide useful information that lead to improved estimation of land surface state variables in hydrologic models. With the availability of high quality observational data, soil moisture information from remote and ground sensing is increasingly used to improve model predictions of soil moisture and ultimately nutrient mobility, irrigation requirements, ponding risks, etc. However, it is a challenge to scale such data assimilation efforts into grower-facing digital agriculture tools due to heavy computational demands.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 5 depicts an example embodiment of a timeline view for data entry.

FIG. 6 depicts an example embodiment of a spreadsheet view for data entry.

FIG. 13 illustrates an example process performed by a data assimilation server.

DETAILED DESCRIPTION

Figure 1:
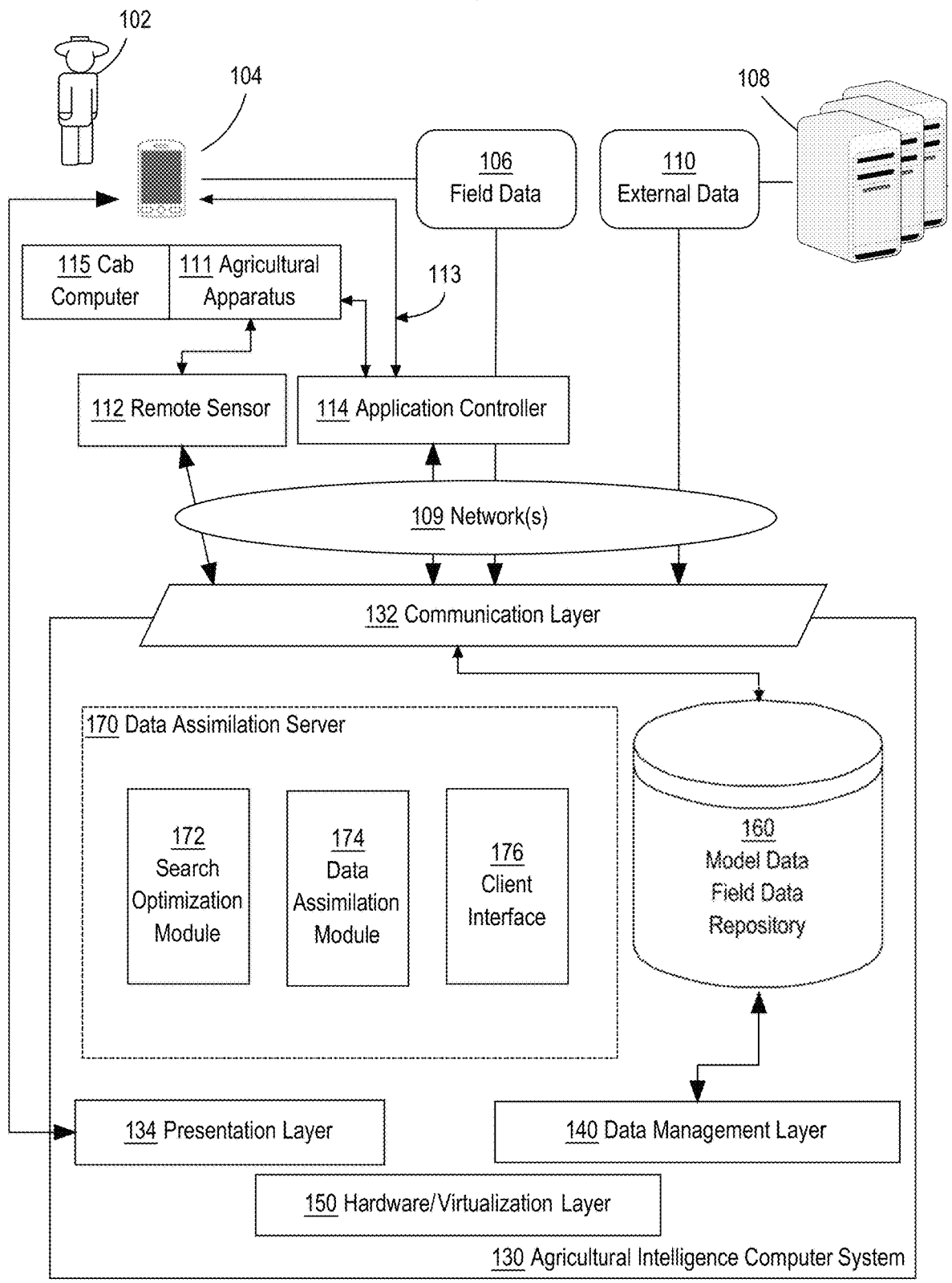
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. FUNCTIONAL DESCRIPTION
   3.1 MEASUREMENT DATA
   3.2 MODEL PARAMETERS
   3.3 ASSIMILATION METHODS
   3.4 SEARCH SPACE REDUCTION
      3.4.1 PRESENCE OF SOIL LAYERS
      3.4.2 CORRELATION BETWEEN SOIL LAYERS OR DEPTHS
      3.4.3 CORRELATION BETWEEN GEOGRAPHIC LOCATIONS
      3.4.4 CORRELATION BETWEEN SOIL HYDRAULIC PARAMETERS
      3.4.5 RELATION WITH TIME OR EVENTS
   3.5 EXAMPLE PROCESSES

1. General Overview

A computer-implemented system for performing sequential data assimilation ("SDA") with a reduced search space and related methods are disclosed. In some embodiments, the system is programmed or configured with data structures and/or database records that are arranged to receive and a computer-executable soil moisture model and a series of soil moisture measurements over time. The system is further programmed to perform a data assimilation trial using an optimization method, such as particle swarm optimization ("SWO"), on the soil moisture model with respect to each of the soil moisture measurements, where results of previous trials are used to improve performance of the current data assimilation trial.

In some embodiments, the model parameters to be optimized include 1) the hydraulic conductivity for saturated soil $K_{sat}$; 2) the saturated volumetric soil moisture content $\theta_s$; 3) the residual volumetric soil moisture content $\theta_r$; 4) the shape parameter n; and 5) the shape parameter $\alpha$ of the Van Genuchten model. Instead of or in addition to the shape parameters n and $\alpha$, other characteristics of the soil water retention function can be used. In applying the optimization method, the system is configured to reduce the search space for the model parameters with various techniques based on the relationships between soil layers or soil depths, the relationships between the model parameters, or the relationships with time or specific hydraulic events.

The data assimilation system produces many technical benefits. The purpose of data assimilation is to improve an agricultural model, and thus the data assimilation system continues to produce a better agricultural model, as confirmed by prior and current studies, to aid in agricultural planning and forecast. The improved agricultural model that is made possible via the present disclosure in turn facilitates improvements in the technology of agriculture and specific field management or growing techniques, such as determining when, where and how much nitrogen or other nutrients or irrigation water to apply to growing fields. Furthermore, the significant reduction of the search space for the agricultural model parameters makes it possible to apply SDA to improve agricultural modeling in production environments. The significant reduction of the search space specifically leads to substantial reduction of computational demand, which enables the pace of improving an agricultural model to match the pace of advancing agriculture technology and increasing measurement data.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U.S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
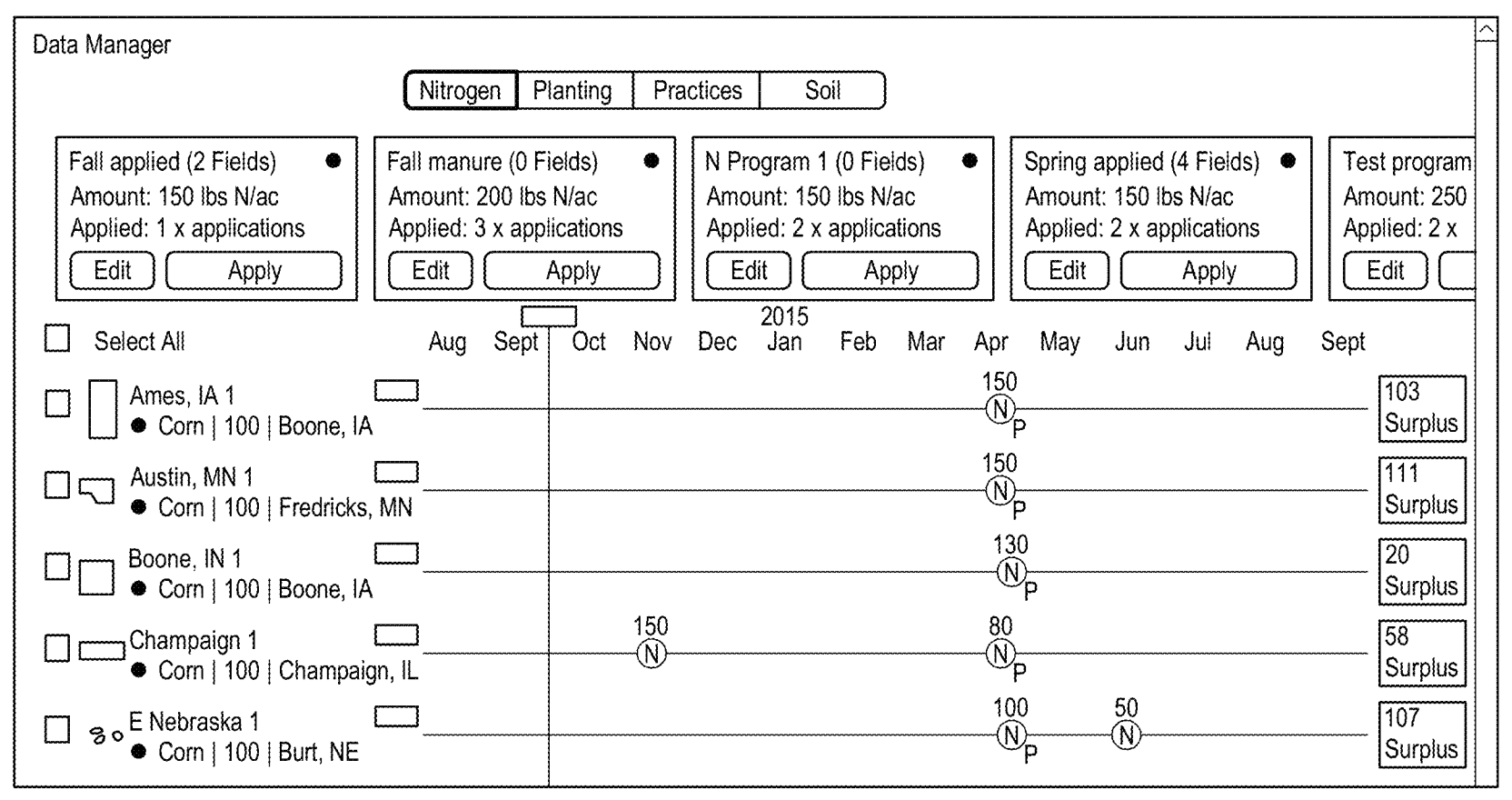

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, agricultural intelligence computer system 130 is programmed to comprise a data assimilation server ("server") 170. The server 170 is further configured to comprise a search optimization module 172, a data assimilation module 174, and a client interface 176. The data assimilation module 174 is configured to receive a given agricultural model and corresponding measurement data, such as a soil moisture model and measurement data regarding soil moisture in a field, and update the agricultural model based on the measurement data with sequential data assimilation. The data assimilation model 174 is further configured to communicate with the search optimization module 172 to reduce the search space for model parameters and expedite the optimization of the model parameter values. The search optimization module 172 is configured to retrieve historical field data or model data from the model data field data repository 160 or receive current field data and other relevant data from the client interface 176. The search optimization module 172 is further configured to analyze the available data and generate certain indicators that can be used to reduce the search space for the model parameters. Such indicators can include the properties of or the relationship between values of a model parameter at different times, the relationship between model parameters, the relationship between soil layers or soil depths, or the relationship between geographic locations. The client interface 176 is configured to communicate with a client device, such as a field manager computing device 104 or a cab computer 105, through the communication layer 132. The client interface 176 can also be configured to communicate with a display device or a remote system that develops or maintains the agricultural model. The communication can include receiving input data, such as field data, or model data including current or default parameter values, or other relevant data, such as soil layer definitions, and transmitting output data, such as model data including updated or optimized parameter values.

Each component of the server 170 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the data assimilation module 174 may comprise a set of pages in RAM that contain instructions which when executed cause performing the location selection functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each component of the server 170 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
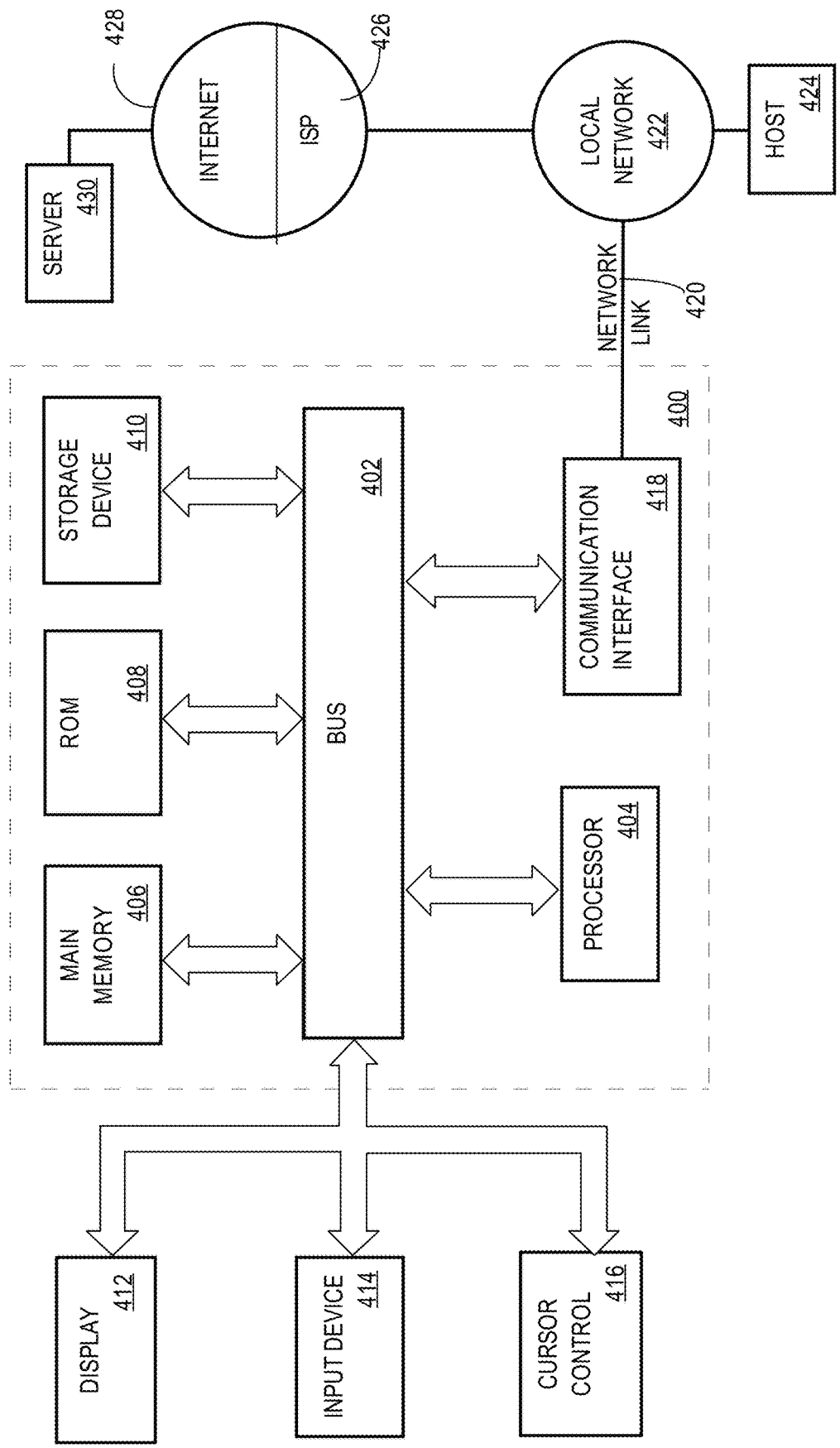
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
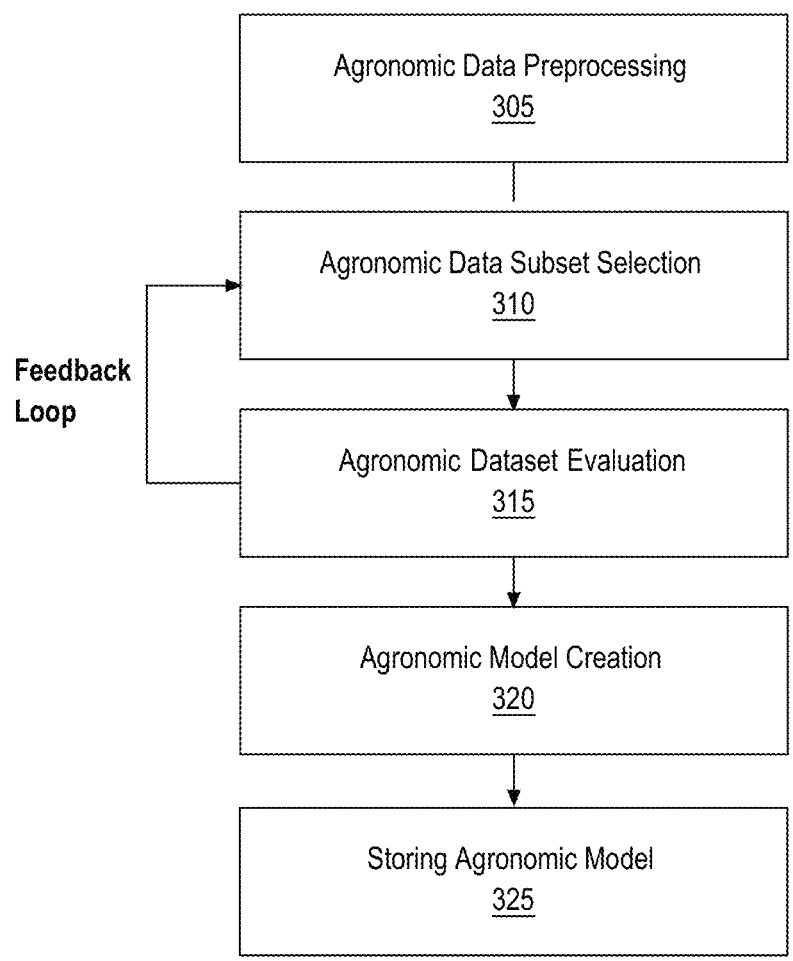
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Functional Description

In some embodiments, the server 170 is programmed to perform sequential data simulation by obtaining a computer-executable model for soil moisture and measurements of soil moisture in the field for a series of time points, and executing an optimization method on the soil moisture model with respect to the soil moisture measurements for the series of time points to optimize parameter values for the soil moisture model. Specifically, the server 170 is programmed to reduce the search space for the model parameters, so that the optimization method can be executed concurrently as the soil moisture measurements for each time point are received, that is, in "real time" or near "real time".

3.1 Measurement Data

In some embodiments, the server 170 is programmed or configured with data structures and/or database records that are arranged to receive measurement data for soil moisture for a series of time points within a measurement period. The measurement data can be produced by different types of sensors at various frequencies in multiple locations. For example, time domain reflectometry ("TDR") sensors, for which errors in measured soil moisture content are on average less than 0.015 $m^3/m^3$, can be used in situ to measure soil moisture content at sub-hourly intervals for weeks or months at multiple depths within the crop root zone in a number of field locations. Measurement data obtained from laboratory analysis, such as gravimetric analysis, or using image-based sensors, which may include satellites or drones, can also be used. The server 170 can be configured to collect or prepare duplicate measurement data for validation purposes.

Measurement periods can range from a few days to a few months. In some embodiments, the server 170 can be configured to receive measurement data corresponding to longer measurement periods, which tend to produce better data assimilation results, at the expense of more significant requirements for computational resources. The server 170 can be further configured to receive measurement data corresponding to measurement periods that cover more changes in measurement values, such as the rainy pre-season or specific dry-out events after heavy rainfall, to produce better data assimilation results.

The measurement data could be obtained by in-ground sensors placed at different soil depths. In some embodiments, the server 170 can be programmed to receive measurement data that cover more depths to produce better assimilation results. As deeper soil layers generally have smaller soil dynamics and thus data assimilation skill increase tends to slow down as the coverage of measurement depth increases, the server 170 can be further programmed to receive measurement data corresponding to a certain number of top soil layers to balance the tradeoff between data assimilation skill and computational resource usage.

In some embodiments, the server 170 is programmed to bridge observation scale mismatches that result from different observational data having different spatial resolution, such as spatial signals ranging from digital images to fields of geophysical variables. One example cross-scale spatial structure is the multiscale autoregressive ("MAR") spatial model, which allows transfer of information across scales.

3.2 Model Parameters

In some embodiments, the server 170 is programmed to receive a soil moisture model that estimates soil moisture of a given sample based on a soil water redistribution process. An example soil water redistribution process is described by the van Genuchten-Mualem model:

$$\frac{\partial \theta}{\partial z} = K_{sat} \cdot K_r \cdot \left(\frac{\partial \psi}{\partial z} + 1\right)$$

$$K_r = f(\theta_r, \theta_s, \alpha, n) = \sqrt{\frac{\theta - \theta_r}{\theta_s - \theta_r}} \cdot \left\{1 - \left[1 - \left(\frac{\theta - \theta_r}{\theta_s - \theta_r}\right)^{\frac{n}{n-1}}\right]\right\}^2$$

$$\psi = g(\theta, \theta_r, \theta_s, \alpha, n) = \frac{1}{\alpha} \cdot \left[\frac{\theta_s - \theta_r}{(\theta - \theta_r)^{\frac{n}{n-1}}} - 1\right]^{\frac{1}{n}}$$

where $\theta$ is the volumetric water content (L·L$^{-1}$); $K_{sat}$ is the saturated hydraulic conductivity (L·T$^{-1}$); $K_r$ is the relative hydraulic conductivity (dimensionless) as a function of the residual volumetric water content $\theta_r$(L·L$^{-1}$), saturated volumetric water content $\theta_s$(L·L$^{-1}$), soil characteristic parameters $\alpha$ (dimensionless), and n (L$^{-1}$); $\psi$ is the soil water potential as a function of soil volumetric water content $\theta$(L·L$^{-1}$), $\theta_r$, $\theta_s$, $\alpha$, and n. The soil water potential $\psi$ typically changes with different volumetric soil moisture content $\theta$, forming a water retention curve. In general, $\theta_s$ and $\theta_r$ determine the upper and lower boundary of the simulated soil moisture, while $\alpha$ and n determine the shape of the water retention curve between $\theta_r$ and $\theta_s$.

In some embodiments, the server 170 is configured to select five of the soil hydraulic parameters in the van Genuchten-Mualem model to be optimized in performing SDA on the soil moisture model: 1) the hydraulic conductivity for saturated soil $k_{sat}$; 2) the saturated volumetric soil moisture content $\theta_s$; 3) the residual volumetric soil moisture content $\theta_r$; 4) the shape parameter n; and 5) the shape parameter $\alpha$. While the five parameters stay relatively unchanged in time, they have different values across different soil layers. For example, the average $K_{sat}$ of two vertically adjacent topsoil layers can different by an order of magnitude or more on cultivated soils, even within the same soil texture class. These parameters also can have different values at different locations—across different farms or within the same farm. Therefore, the server 170 is further programmed to establish the five soil hydraulic parameters for each soil layer ("model parameters") at a geographic location. The server 170 can also be programmed to select additional or alternative model parameters for optimization, such as land surface temperature, depending on the availability of measurement data for the model parameter, the nature of the model parameter, or other factors.

In some embodiments, the server 170 is programmed to define the search space for each model parameter. The definition can be based on class average hydraulic parameters ($\mu$ values with accompanying $\sigma$ values for standard deviation) for different soil layers from a public database, such as ROSETTA. Specifically, the upper and lower boundary of the search space for a model parameter is set to be $\mu \pm \sigma$, respectively. Alternatively, the definition can be based on select measurement data from target farms. The server can also be configured to determine a default value for each model parameter. For example, local $K_{sat}$ values are often available in public databases, and the values for the other model parameters can be computed with specific pedotransfer functions.

3.3 Assimilation Methods

In some embodiments, the server 170 is programmed to apply sequential data assimilation that enhances the use of information between imperfect modeled states and observed states in a way that preserves the water mass and energy balance. The SDA generally comprises a series of data assimilation trials corresponding to a plurality of time points and provides the first guess of the state of a given model at the next data assimilation trial, while corrections are made to this first guess based on subsequent observations. To enhance the use of information between imperfect modeling and observations, SDA can include performing Bayesian updates on soil hydraulic model parameters conditioned on the available soil moisture sensor data. Specifically, with P, $P_{best}$, $\theta_{mod}$ and $\theta_{obs}$ representing the soil hydraulic parameter values in the soil moisture model, the optimized soil hydraulic parameter values, modeled soil moisture produced by the soil moisture model (before optimization) and measured soil moisture data, the ultimate goal is to find better values for the soil hydraulic parameters that maximize the posterior distribution:

$$P_{best} \equiv \arg\max_P p(P \mid \theta_{mod}, \theta_{obs})$$

by updating the distribution of soil hydraulic parameters $P(P \mid \theta_{mod}, \theta_{obs})$ using the Bayes theorem:

$$p(P \mid \theta_{mod}, \theta_{obs}) = \frac{p(\theta_{obs} \mid P, \theta_{mod}) \cdot p(P \mid \theta_{mod})}{p(\theta_{obs} \mid \theta_{mod})} \propto p(\theta_{obs} \mid P, \theta_{mod})$$

Implementing this Bayesian method can be boiled down to establishing the conditional likelihood function $P(\theta_{obs} \mid P, \theta_{mod})$, which determines how much information can be propagated from the soil moisture measurements to the soil hydraulic parameters, as further discussed below.

To estimate the conditional likelihood function, a loss function is specified to quantify the cost associated with using P as the parameter values when the actual parameter values were $P_{best}$ with each data assimilation trial (at each time step inside the assimilation window). Here $h_{\theta_{obs}}(P, \theta_{mod})$ is defined as quadratic:

$$p(\theta_{obs} \mid P, \theta_{mod}) \propto \frac{1}{h_{\theta_{obs}}(P, \theta_{mod})}$$

$$h_{\theta_{obs}}(P, \theta_{mod}) = \sqrt{\left(\theta_{mod}^{t,l} - \theta_{obs}^{t,l}\right)^2_{t \in T, l \in L}}$$

where t represents a time step and l represents a soil layer; T refers to the assimilation window; L refers to the soil layers with observations available; $\theta_{mod}^{t,l}$ and $\theta_{obs}^{t,l}$ are predicted and observed soil moisture content for soil layer l at time step t respectively.

By minimizing the loss function $h_{\theta_{obs}}(P, \theta_{mod})$, we solve for the conditional likelihood function and ultimately the posterior distribution $P(P \mid \theta_{mod}, \theta_{obs})$.

In some embodiments, in each data assimilation trial, the server 170 is configured to apply an optimization method on the soil moisture model with respect to measurement data for a specific time point. Examples of such an optimization method include Particle Filter ("PF") or Particle Swarm Optimization ("PSO"). Both optimization methods are Monte Carlo techniques that use samples (i.e., ensemble members or particles) to estimate the underlying probability density function of model states and parameters.

In some embodiments, prior to performing SDA, the server 170 is programmed to generate an initial set of possible solutions, the so-called particles $P^i$, for the set of model parameters (soil hydraulic parameters corresponding to a specific soil layer):

$$P^i = (K_{sat}^l, \theta_s^l, \theta_r^l, \alpha^l, n^l), i=1,2,\ldots,n.$$

$l \in L$, $L=\{$soil layers with observations available$\}$

The initial set of particles can be generated from sampling the search space for the model parameters, by Latin hypercube sampling or other sampling techniques. The initial set of particles are also assigned randomized initial velocity vectors that affect their values on the next iteration.

In some embodiments, the server 170 is further programmed to perform SDA for a soil moisture time-series measurement corresponding to a specific measurement period or duration (assimilation window) with an estimate of its uncertainty. The uncertainty can be used to determine the tolerance threshold $\phi$ related to the objective function, as further discussed below. Generally, as soon as the measurement data for one time point becomes available, a data assimilation trial in which an optimization method is executed on the given model with respect to the measurement data can be conducted. Specifically, the server 170 is configured to run the soil moisture model using the particles, instead of default or other model parameter values, to produce soil moisture predictions. The server 170 is further programmed to compare the measured soil moisture to the predicted soil moisture and adjust the particles with respect to an objective function in the current iteration. An example of such an objective function is the root mean square error of the soil moisture prediction and observation, as further discussed below. The adjustment takes into account the directionality to both an individual particle's historical best position and the entire set of particles' historical best position. In the next data assimilation trial, the adjusted particles are then used to produce the soil moisture predictions. The iterative process continues to calculate the optimal model parameter values that bring the modeled soil moisture closest to the observation. Exit conditions to the iterative loop include maximum allowable thresholds for both the objective function and total number of iterations.

In some embodiments, the objective function can be an objective function assuming a Gaussian error distribution, such as one that computes the root mean square error ("RMSE") of modeled and measured soil moisture. As discussed above, as minimizing the loss function, which is defined as the sum of the different RMSE values over different time steps, helps estimate the posterior conditional distribution, the RMSE can be used as the objective function for each time step. The server 170 is configured to terminate the iterative process when the number of iterations, the value of the objective function, or the amount of usage of a certain computational resource reaches a corresponding threshold.

In some embodiments, the optimization method is Particle Swarm Optimization. In PSO, a set of particles are generated with an initial guess of model parameter values and a random velocity value at each dimension for each particle. The initial model parameter values and velocities are updated based on the particles' objective function values. This process is iterated until all particles converge to an optimum (producing an optimal objective function value) or a maximum number of iteration is reached. The model parameter values after the last iteration are taken as the optimized values. PSO can be implemented using any PSO module or library known to someone skilled in the art. For example, the hydroPSO function in the hydroPSO package (version 0.3-4) under the R project can be executed, with the following key parameter values: 1) lower and upper boundary of parameter search space set to the mean +/− one standard deviation of the parameters values of the same textures, based on statistics from soil parameter database, 2) number of particles in one swarm (npart)=50, 3) maximum number of iteration (maxis)=100, and 4) Sampling method (Xini.type and Vini.type)="lhs" and "lhs2011".

Figure 7:
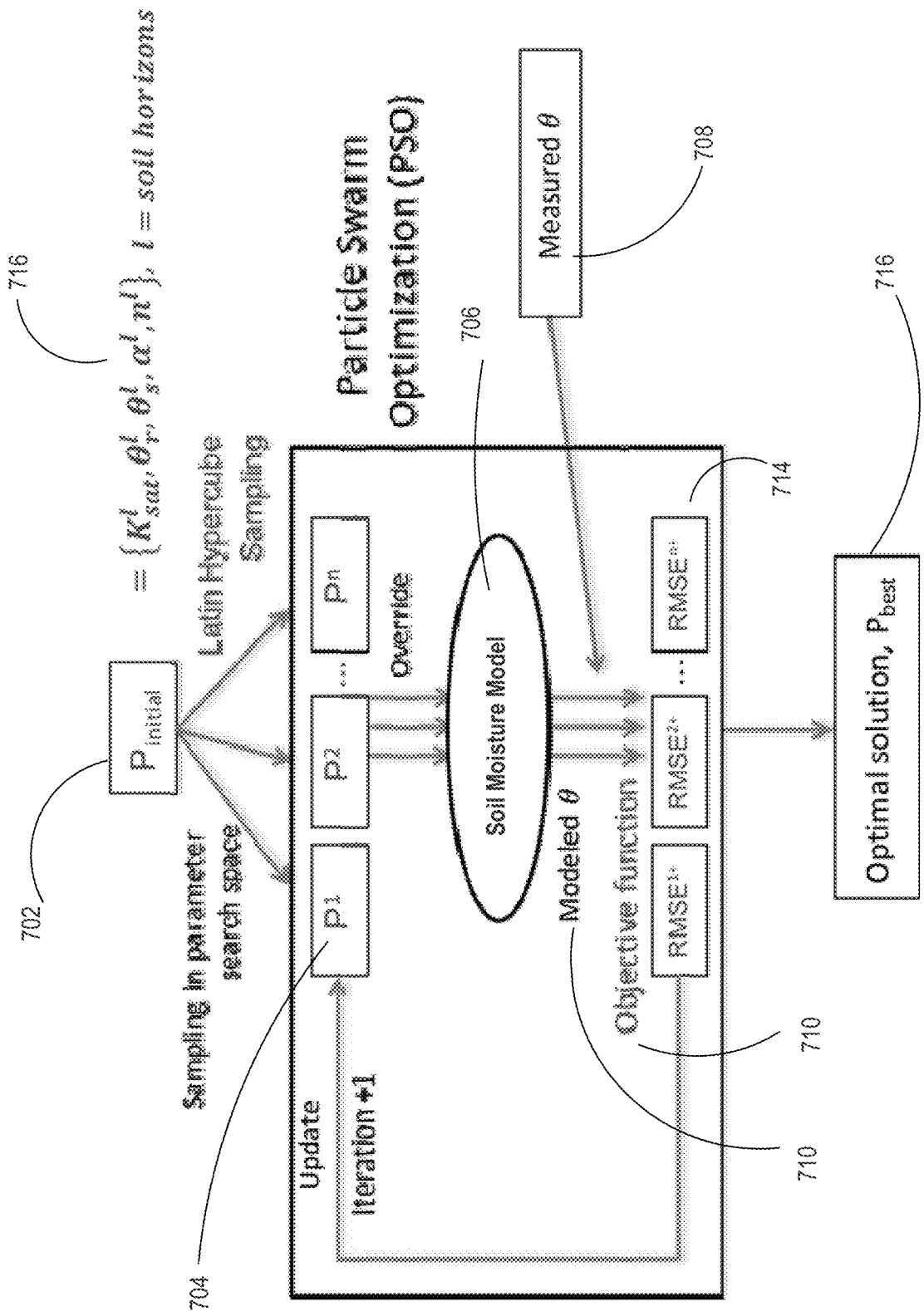
FIG. 7 illustrates an example architecture for executing an optimization method in sequential data assimilation.

FIG. 7 illustrates an example architecture for executing an optimization method in sequential data assimilation. In some embodiments, an initial set of possible solutions or particles $P^1$ through $P^n$ 704, each containing one value for each model parameter to be optimized 716, is selected from the initial model parameter space $P_{initial}$ 702. The model parameters can be the five soil hydraulic parameters for each soil layer, as discussed above. The selection can be performed using Latin hypercube sampling. A soil moisture model 706 is then executed on each of the initial set of solutions, together with the other parameter values that correspond to the soil moisture measurement 708, to generate a soil moisture modeled value 710. An example of a program implementing the soil moisture model 706 is Nitrogen Advisor, commercially available from The Climate Corporation, San Francisco, Calif. These other parameter values can correspond to date, temperature, or other parameters of the given soil moisture model 706. An objective function 712 is then executed for each modeled soil moisture 710 with respect to the measured soil moisture 708 to generate an objective function value, such as an RMSE value 714. Based on the set of objective function values and specific velocity functions, the particles are updated for use in the next iteration. The iterative process terminates with a proposed optimal solution $P_{best}$ 716 for the set of model parameters. When the next soil moisture measurement becomes available, information gleaned from the current data assimilation trial regarding the search space or the values of the model parameters can be passed on to the next data assimilation trial.

In some embodiments, the server 170 is programmed to apply particle tracking or regrouping triggering to the PSO for performance improvement. In terms of particle tracking, the search space at each iteration, which may be reduced using some of the techniques discussed below, can be reused in subsequent iterations, to ensure a smaller and smaller search space over the course of executing the PSO. In terms of regrouping, when the modeled soil moisture deviates from the measured soil moisture for more than a certain amount and yet the objective function values for the particles fail to improve more than a certain amount, the particles can be regrouped to center around the current global best particle.

In some embodiments, the optimization method is Particle Filter. In PF, instead of being adjusted directly as in PSO, the particles are assigned prior weights based on prior information and the prior weights are adjusted based on the particles' objective function values. The optimal parameter values are determined based on the posterior weights.

In some embodiments, the server is programmed to skip accounting for its objective function value to compute the optimal parameter values (e.g., PF) or to update the parameter values of in the next iteration (e.g., PSO) in response to numerical instability for combinations of parameter values within the search space. Specifically, the optimization method is generally effective to the extent that the calculation of soil moisture is numerically stable when solving the infiltration equations. Whether the calculation is numerically stable can be related to soil layering (i.e., how the soil layers are defined), incoming rainfall, or current soil moisture contents. When the calculation is numerically unstable, the assimilation is generally invalid (i.e., providing no improvement in parameter optimization). Therefore when numerical instability is detected, the server is programmed to automatically skip the current assimilation attempt (no updates on parameter values) and proceed to assimilation based on the next event.

In some embodiments, upon performing SDA and improving the model parameter values, the server 170 is programmed to reuse the model parameter values for a second agricultural model related to the soil moisture model, such as a model for soil nitrate which depends on soil moisture. In other words, the second agricultural model can be executed with the improved model parameter values to generate new predictions.

3.4 Search Space Reduction

The generally large size of the search space for model parameters due to the number of soil hydraulic parameters, the value range of each model parameter, the number of soil layers, or other factors, means that performing SDA or specifically executing the optimization method can require substantial time and computational resources. The server 170 is programmed to reduce the search space by improving one or more of the relevant factors. Some of these techniques can be applied prior to performing SDA, while some that are time-dependent can be applied prior to conducting a data assimilation trial based on measurement data corresponding to an appropriate time point.

3.4.1 Presence of Soil Layers

In some embodiments, the server 170 is programmed to reduce the size of the search space by disabling the model parameters associated with certain soil layers defined in the soil moisture model. The class average hydraulic parameters noted above, for example, are provided for approximately a dozen different soil layers. For any given location, however, often a smaller number of those soil layers can be present. While the given soil moisture model may associate a default number of soil layers, such as six, with all farms or locations, the model parameters associated with certain soil layers do not need to be optimized for certain farms or geographic locations because the corresponding soil layers are not present. Therefore, the server 170 is programmed to re-stratify the soil profile over a depth of 0-1.2 m into fewer soil horizons—the soil layers that are present at the given geographic location.

Figure 8:
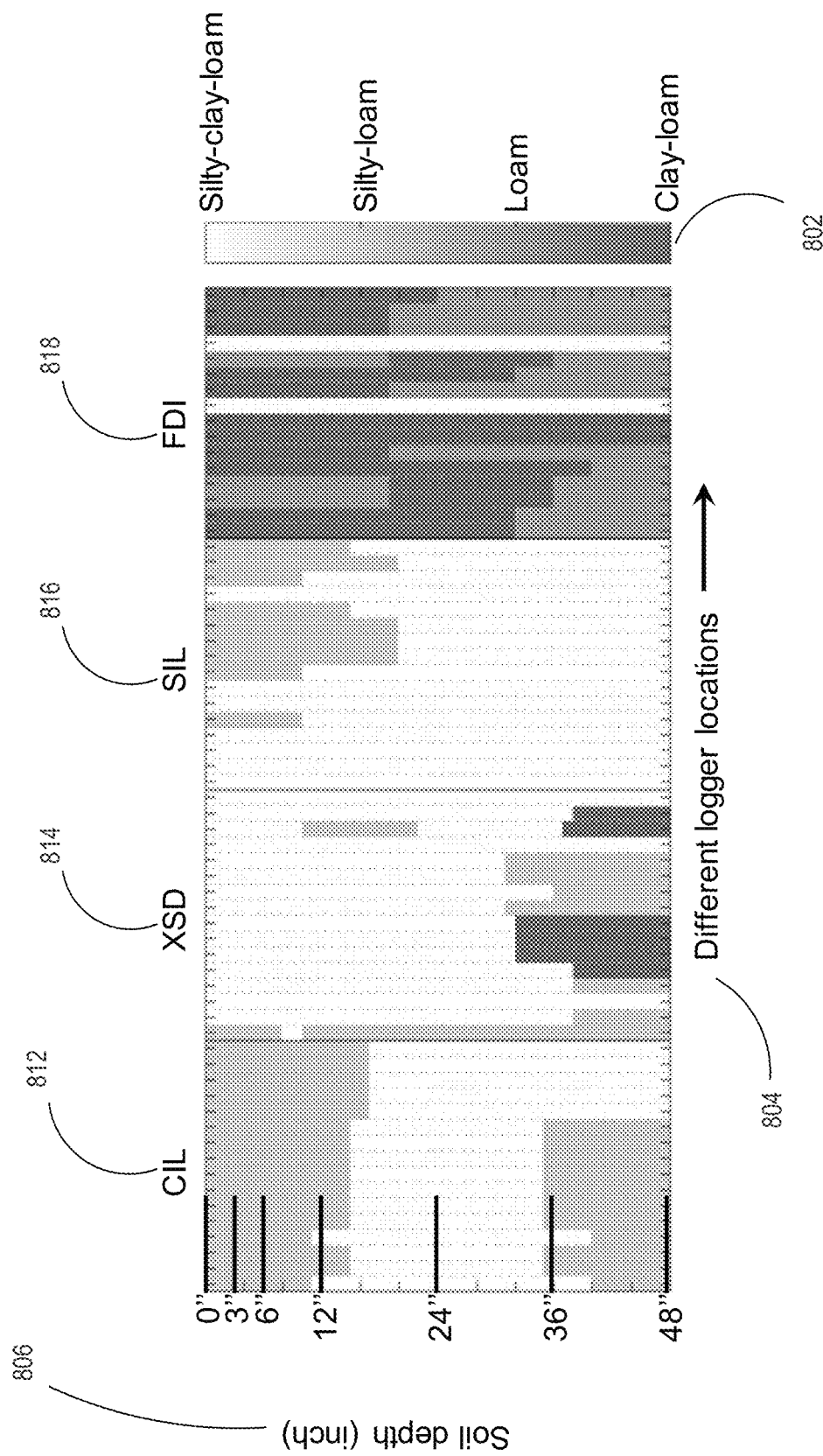
FIG. 8 illustrates example distribution of soil layers at different depths and locations.

FIG. 8 illustrates example distribution of soil layers at different depths and locations. The figure covers four farms, CIL 812, XSD 814, SIL 816, and FDI 818. The x-axis 804 indicates different locations within the farms, and the y-axis 806 indicates the soil depth. The figure shows that different soil layers according to the legend 802 can be present at different depths and across different geographic locations. For example, in CIL 812, only silty-loam and silty-clay-loam are present, with the latter appearing at depths of approximately between 12" and 36". At most of these geographic locations, only two out of the dozen soil layers are present.

In some embodiments, for each given farm having mostly homogeneous soil texture or for its representative location, the server 170 is programmed to divide the soil profile (soil volume between 0-1.2 m) into 48 0.025 m-thick-layers ("thin layers"). Based on the soil texture class (each corresponding to one of the dozen known soil layers from SSURGO, for example) of the thin layers, the server is configured to group adjacent thin layers with the same or similar texture classes together to form a soil horizon. For example, the server can be configured to compare the difference in the soil properties, such as soil type, between adjacent thin layers against a specific similarity threshold to determine whether the two adjacent thin layers are similar. Some field data show that approach could convert a default 6 soil layers used in a soil moisture model for each location to 1-4 soil horizons for individual locations. Optimizing only the model parameters associated with the relevant soil horizons reduces the search space.

In some embodiments, the server 170 is programmed to determine default model parameter values associated with a soil horizon consolidated from similar texture classes or known soil layers by taking a depth-weighted average of the model parameter values associated with the known soil layers. The default model parameter values for a such a soil horizon can also be determined by simple aggregation or by consideration other environment factors.

3.4.2 Correlation Between Soil Layers or Depths

In some embodiments, the server 170 is programmed to reduce the size of the search space based on correlations between soil layers or depths. The nature and depth of a soil layer can determine how water percolates or infiltrates through the soil layer to the next deeper soil layer. In general, the dissipative forces of the moisture are a lot slower than the rainfall out of the cloud. In addition, some of the water is subject to evaporation, some is used by the plant depending upon the season, and some is to be on drainage below. Characterization of this process in theory or based on prior experiments can be used to derive the model parameter values for a soil horizon from the model parameter values for the soil horizon above.

Figure 9:
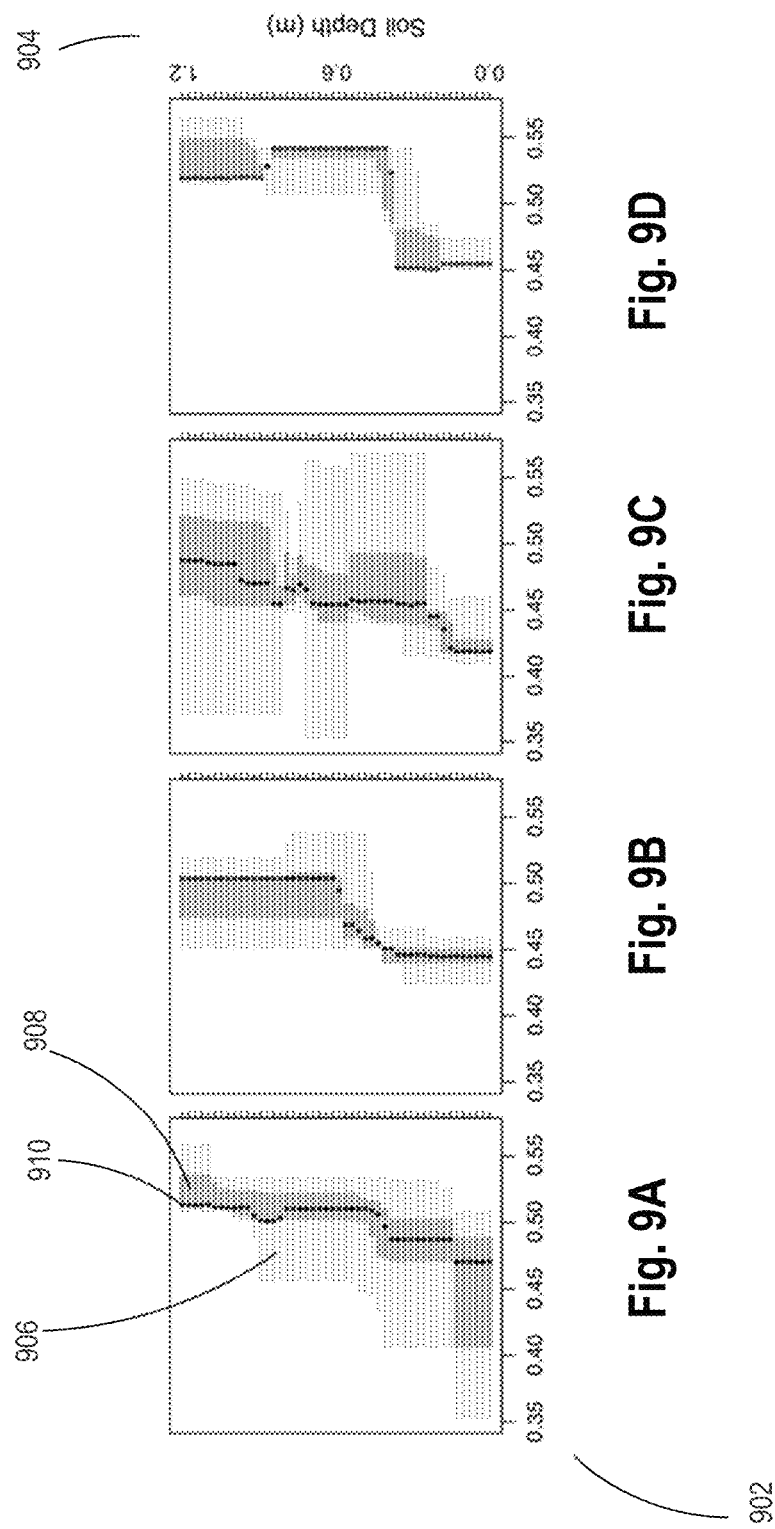
FIG. 9 illustrates example relationships between soil depths for one model parameter.

FIG. 9 illustrates example relationships between soil depths for one model parameter. FIG. 9A, FIG. 9B, FIG. 9C, and FIG. 9D show the relationship between $\theta_s$ and soil depth respectively at four different farms. Specifically, the x-axis 902 indicates the value of $\theta_s$, and the y-axis 904 indicates the soil depth. The the box 908 (lightest) shows the the first and third quartiles for $\theta_s$ values; whisker 910 shows 1.5 times the interquartile (between the first and third) range; the mid line 910 (darkest) in box shows the median. These figures indicate that the value of $\theta_s$ consistently goes down for deeper soil horizons through different texture classes (at least in the first three fields), although the types of the texture classes could determine the rate of decrease. This could be an expected pattern for many depositional soil environments where compaction increases over depth and time. The decrease relationship can be determined based on depth information alone or in combination with texture class information to assist in the derivation of the values of $\theta_s$ at different soil horizons or soil depths.

3.4.3 Correlation Between Geographic Locations

In some embodiments, the server 170 is programmed to reduce the size of the search space based on correlations between geographic locations. The values of a model parameter at different locations may move in a uniform fashion because the different locations are geographically near or share other properties. When the value of the model parameter is determined for one of such locations, the value for another one of such locations can then be derived.

Figure 10:
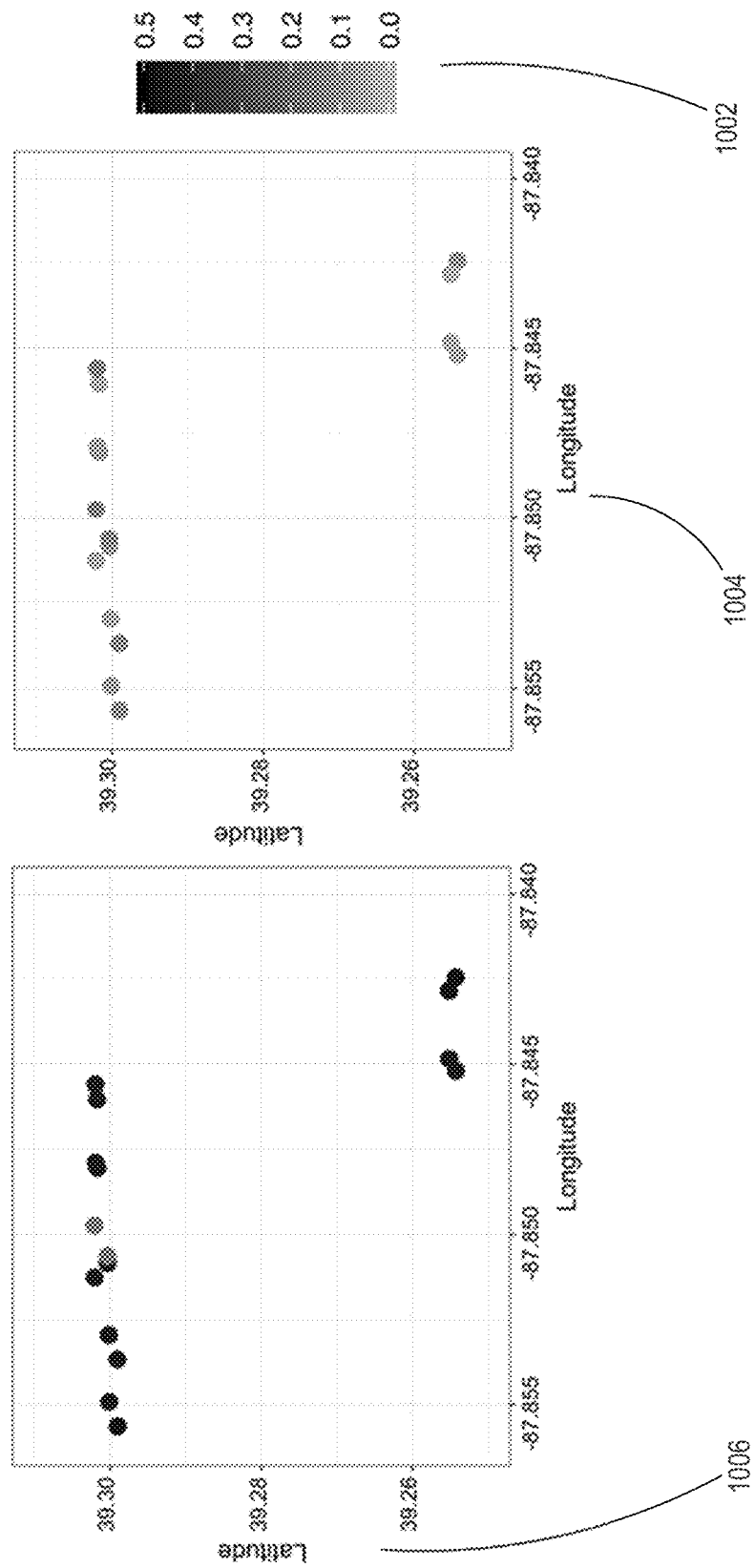
FIG. 10 illustrates example error values for one model parameter before and after a data assimilation trial.

FIG. 10 illustrates example error values for one model parameter before and after a data assimilation trial. FIG. 10A and FIG. 10B show the RMSE values according to the RMSE scale 1002 for $K_{sat}$ for certain geographical locations respectively before and after a data assimilation study. The certain geographical locations are indicated by the longitude 1004 and the latitude 1006. These figures show that the values of $K_{sat}$ likely move in a uniform fashion at the indicated locations, as the RMSE values all change from the 0.4-0.5 range before the data assimilation trial to the 0-0.1 range afterwards. In this case, the fact that all these locations are all located at a longitude between a relatively small range might have contributed to the potential uniform movement.

3.4.4 Correlation Between Soil Hydraulic Parameters

In some embodiments, the server 170 is programmed to reduce the search space based on correlations between soil hydraulic parameters. The correlations between two soil hydraulic parameters may exist for certain value ranges, soil layers, depths, locations, and so on. Based on the correlation, the value of one soil hydraulic parameter can be derived from the value of another soil hydraulic parameter. For example, there is a relationship between $K_{sat}$ and $\alpha$ related to capillary action. For sand that drains very easily, the $K_{sat}$ value is relatively large and the $\alpha$ value is relatively small in some inverse relationship.

Figure 11:
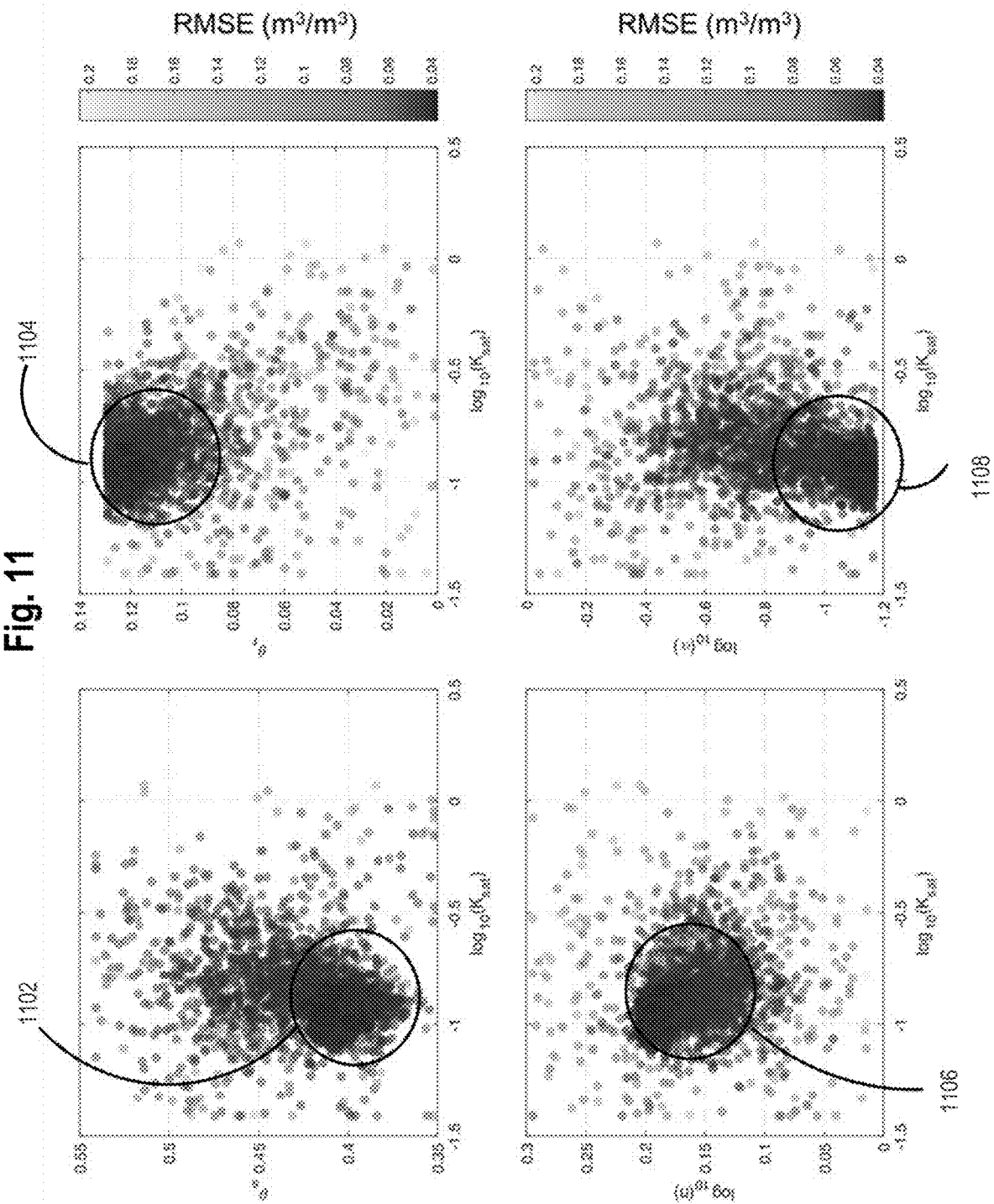
FIG. 11 illustrates example relationships between different model parameters.

FIG. 11 illustrates example relationships between different soil hydraulic parameters. FIG. 11A, FIG. 11B, FIG. 11C, and FIG. 11D plot the RMSE values associated with soil moisture from certain data assimilation trials for different value combinations two model parameters, with the first model parameter being $K_{sat}$ and the second model parameter being $\theta_s$, $\theta_r$, n, and $\alpha$, respectively. These figures show that the RMSE values tend to be minimized for certain value combinations, which means that when one model value in the value combination occurs, the other model value can be derived. Specifically, the value of $K_{sat}$ in all four preferred value combinations 1102, 1104, 1106, and 1108 is approximately between −1.25 and 0.5. In the preferred value combination 1102, the value of $\theta_s$ is approximately between 0.35 and 0.45. In the preferred value combination 1104, the value of $\theta_r$ is approximately between 0.06 and 0.14. In the preferred value combination 1106, the value of n is approximately between 0.1 and 0.2. In the preferred value combination 1108, the value of $\alpha$ is approximately between −1.2 and −1. Therefore, when the value of $K_{sat}$ is between −1.25 and 0.5, the value of each of the four other hydraulic parameters may be estimated or limited.

3.4.5 Relation with Time or Events

In some embodiments, the server 170 is programmed to reduce the search space based on relationships between a model parameter and time or specific events. The value of a model parameter may be better learned during certain times of a year or certain events. For example, when soil is very wet, soil moisture observations provide little information on $\theta_r$. Therefore, the server 170 can be programmed to exclude $\theta_r$ from the search space under very wet conditions. In performing SDA, the value of $\theta_r$ determined in the previous data assimilation trial can then be used for the current data assimilation trial to avoid optimization of the model parameter in the current data assimilation trial. Similarly, dry seasons generally do not favor the learning of $\theta_s$, and the server 170 can be programmed to exclude $\theta_s$ from the search space under very dry conditions.

Figure 12:
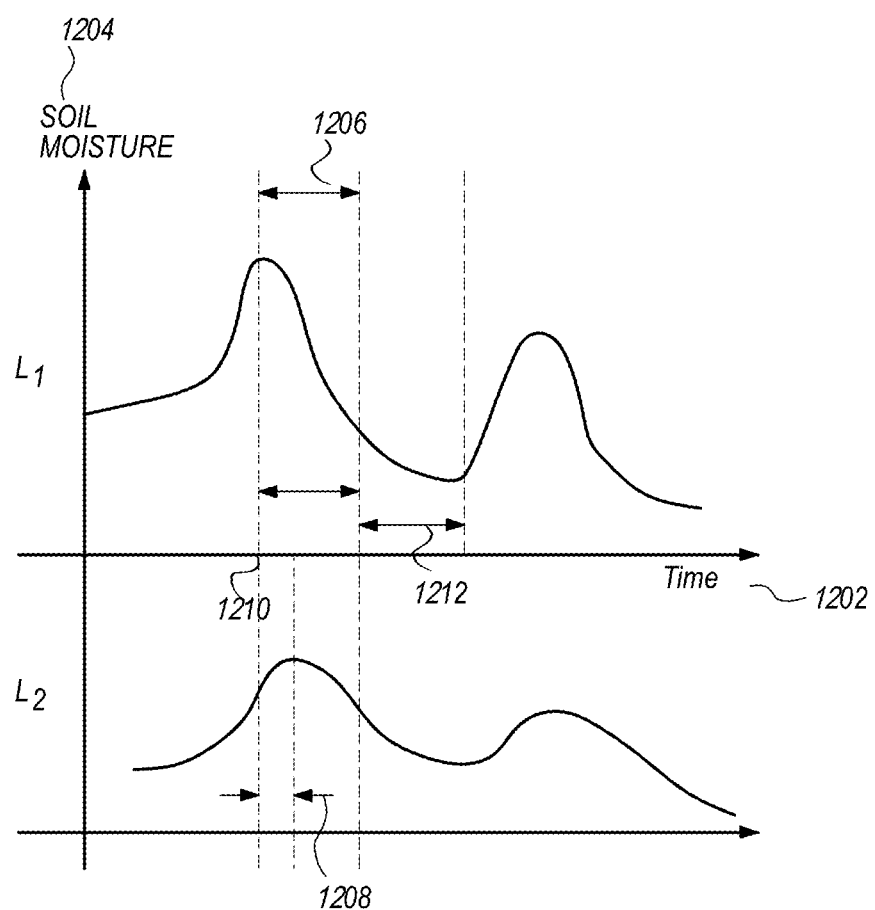
FIG. 12 illustrates example water retention time series data for two soil horizons.

FIG. 12 illustrates example water retention time series data for two soil horizons. The figure depicts the relationship between time 1202 and soil moisture 1204 at a top soil horizon L1 and the next soil horizon and L2. At time 1210, there is a rainfall event. The period 1206 right after the rainfall event tends to contain rich information for learning $\theta_s$. The period 1208 between the wetting up of L1 vs. the wetting up of L2 tends to contain rich information for learning $K_{sat}$. The period 1212 corresponds to the middle of a season when the crop has already taken up so much moisture that $\theta_r$ is actually being approached in real time.

In some embodiments, the server 170 is programmed to identify triggers for the exclusion of a model parameter for optimization in a data assimilation trial based on historical environment reports or prior data assimilation data. For example, a trigger can be associated with the average amount of rainfall during the last two weeks, at a certain time of year, or for any other period of event that can be shown to generally lead to no improvement in the value of a model parameter.

In some embodiments, the server is programmed to disable optimizing the value of a model parameter based on both its correlation with another model parameter and the relation with time. For example, $\theta_s$ and $\theta_r$, which respectively represent an upper bound and a lower bound on modeled soil moisture, tend to be learnable at different times. When the measured soil moisture for a data assimilation trial is close to the default value of $\theta_s$, such as within 20% of the default value, the measurement data at the time may contains rich information for learning $\theta_s$ but little information for learning $\theta_r$. Therefore, the optimization of $\theta_r$ can be turned off in the next data assimilation trial to be performed sufficiently close in time.

3.5 Example Processes

FIG. 13 illustrates an example process performed by the data assimilation server. In some embodiments, in step 1302, the server is programmed to receive a soil moisture model with a plurality of model parameters for a given geographical location. The plurality of model parameters can include the hydraulic conductivity for saturated soil $K_{sat}$; the saturated volumetric soil moisture content $\theta_s$; the residual volumetric soil moisture content $\theta_r$; the shape parameter n; and the shape parameter $\alpha$ of the Van Genuchten model. The plurality of model parameters can also include one soil hydraulic parameter for each of a plurality of soil layers, such as the dozen soil layers published in SSURGO.

In step 1304, the server 170 is programmed to identify a time-based or event-based trigger for a first of the plurality of model parameters. The time-based or event-based trigger can be a season where a historical rainfall average exceeds a certain threshold, a certain period after a heavy rainfall, or a certain period after a heavy rainfall through a certain soil layer. Such a trigger generally corresponds to the beginning of a period when measurement data is especially suited or unsuited for learning one of the model parameters and thus can signal enabling or disabling optimizing the value of the parameter with respect to the measurement data.

In step 1306, the server 170 is further programmed to receive a plurality of values of soil moisture measured from soil samples for a series of time points. These measurements can be obtained in various ways, such as by in-soil sensors analyzed in real time or in a laboratory setting or by image-based detectors. The server 107 can also be configured to set restraints on the length of the time series or the start date and end date of the time series to improve SDA performance.

In step 1308, the server 170 is programmed to perform SDA through the series of time points as soon as the plurality of measured values are received for each of the series of time points. Specifically, the server 170 is configured to implement a series of data assimilation trials corresponding to the series of time points, each including executing an optimization method to optimize values of the plurality of mode; parameters with respect to the plurality of measured values for the corresponding time point, thereby obtaining a plurality of optimized values for the plurality of parameters. The optimization method can be PSO or PF. The sequential nature of the data assimilation means each subsequent data assimilation trial is related to a previous data assimilation trial. For example, the set of optimized values from a previous data assimilation trial can be used as initial particles for the current data assimilation trial, or the final search space for the parameters can be used to limit the search space in the current data assimilation trials.

In some embodiments, in performing SDA, the server 170 is configured to incorporate various techniques to reduce the search space for the model parameters. These techniques can be applied at the outset or between data simulation trials. For example, when the time-based or event-based trigger noted above is satisfied for one of the series of time points, the server 170 can be configured to reduce the search space associated with the first model parameter in executing the optimization method, such as limiting the possible range of values or turning off optimization for the first model parameter altogether. Other techniques that can be applied can be based on correlations between soil layers or depths for a model parameter or correlations between two soil hydraulic parameters. The server 170 can be further programmed to disable optimization for model parameters associated with an entire soil layer by recognizing that the soil layer is not present at the geographical location.

In some embodiments, the server 170 is further configured to transmit the result of performing SDA, namely optimized values for the parameters of the soil moisture model, to a display device or a remote server that maintains or uses the soil moisture model. The transmitted data can also include information regarding the differences from the default values for the model parameters, the dates and times when the series of measurements used to improve the soil moisture model were made, or the manner in which the measurements were made. The transmitted data can help improve prediction of soil moisture, current nitrate level in the soil, or a required amount of additional nitrate to achieve a certain crop yield, which can then be communicated to growers. The transmitted data can help improve future preparation of measurement data for the server 170 to further optimize the model parameter values through SDA.

What is claimed is:

1. A computer-implemented method of assimilation of soil moisture data, comprising:
   receiving, by a processor, a digital data model related to soil moisture with a plurality of parameters for a given geographical location, the digital data model comprising an electronic digitally stored set of executable instructions;
   identifying, using the processor, a time-based or event-based trigger for a first parameter of the plurality of parameters of the digital model related to soil moisture for the given geographical location;
   receiving, by the processor, a plurality of values of soil moisture measured from soil samples for a series of time points;
   applying sequential data assimilation through the series of time points when the plurality of measured values are received for each time point of the series of time points, by executing an optimization method that optimizes an objective function to find best values for the plurality of parameters from a search space of values for the plurality of parameters of the digital model with respect to the plurality of measured values for each time point of the series of time points,
   when the time-based or event-based trigger is satisfied for a time point of the series of time points, reducing the search space by reducing a number of values in the search space to be searched for the first parameter in executing the optimization method.

2. The computer-implemented method of claim 1, the time-based or event-based trigger being a season where a historical rainfall average exceeds a certain threshold, a certain period after a heavy rainfall, or a certain period after a heavy rainfall through a certain soil layer.

3. The computer-implemented method of claim 1, further comprising, upon applying the sequential data assimilation, causing display of a recommended increase of nitrate level in soil based on the optimized values of the plurality of parameters.

4. The computer-implemented method of claim 1, further comprising
   identifying a correlation between two of the plurality of parameters,
   the applying being performed with a reduced search space for one of the two parameters based on the correlation.

5. The computer-implemented method of claim 1, the optimization method being particle swarm optimization.

6. The computer-implemented method of claim 1,
   the plurality of values of soil moisture being measured by in-soil sensors,
   any two consecutive time points of the series of time points being up to 15 minutes apart.

7. The computer-implemented method of claim 1, the plurality of parameters includes a hydraulic conductivity for saturated soil $K_{sat}$, a saturated volumetric soil moisture content $\theta_s$, a residual volumetric soil moisture content $\theta_r$, a first shape parameter n, or a second shape parameter $\alpha$ of the of the Van Genuchten model.

8. The computer-implemented method of claim 1, further comprising
   defining a group of soil horizons for the geographical location,
   the plurality of parameters including one set of parameters for each of a plurality of soil layers,
   the group of soil horizons corresponding to a subset of the plurality of soil layers, the applying being performed with a reduced search space based on the group of soil horizons.

9. The computer-implemented method of claim 8, defining a group of soil horizons comprising:
classifying the geographical location vertically into a number of thin layers, each associated with a soil layer, and
merging two consecutive thin layers associated with identical or similar soil layers into a soil horizon.

10. The computer-implemented method of claim 8, further comprising
identifying a correlation between two of the soil horizons for the geographical location for a second of the plurality of parameters,
the applying being performed with a reduced search space for the second parameter based on the correlation.

11. A non-transitory storage medium storing instructions which, when executed by one or more computing devices, cause performance of a method of assimilation of soil moisture data, the method comprising:
receiving, by a processor, a digital data model related to soil moisture with a plurality of parameters for a given geographical location, the digital data model comprising an electronic digitally stored set of executable instructions;
identifying, using the processor, a time-based or event-based trigger for a first parameter of the plurality of parameters of the digital model related to soil moisture for the given geographical location;
receiving, by the processor, a plurality of values of soil moisture from soil samples for a series of time points;
applying sequential data assimilation through the series of time points when the plurality of measured values are received for each time point of the series of time points, by executing an optimization method that optimizes an objective function to find best values for the plurality of parameters from a search space of values for the plurality of parameters of the digital model with respect to the plurality of measured values for each time point of the series of time points,
when the time-based or event-based trigger is satisfied for a time point of the series of time points, reducing the search space by reducing a number of values in the search space to be searched for the first parameter in executing the optimization method.

12. The non-transitory storage medium of claim 11, the time-based or event-based trigger being a season where a historical rainfall average exceeds a certain threshold, a certain period after a heavy rainfall, or a certain period after a heavy rainfall through a certain soil layer.

13. The non-transitory storage medium of claim 11, the method further comprising, upon applying the sequential data assimilation, causing display of a recommended increase of nitrate level in soil based on the optimized values of the plurality of parameters.

14. The non-transitory storage medium of claim 11, the method further comprising identifying a correlation between two of the plurality of parameters, the applying being performed with a reduced search space for one of the two parameters based on the correlation.

15. The non-transitory storage medium of claim 11, the optimization method being particle swarm optimization.

16. The non-transitory storage medium of claim 11,
the plurality of values of soil moisture being measured by in-soil sensors,
any two consecutive time points of the series of time points being up to 15 minutes apart.

17. The non-transitory storage medium of claim 11, the plurality of parameters includes a hydraulic conductivity for saturated soil $K_{sat}$, a saturated volumetric soil moisture content $\theta_s$, a residual volumetric soil moisture content $\theta_r$, a first shape parameter n, or a second shape parameter $\alpha$ of the of the Van Genuchten model.

18. The non-transitory storage medium of claim 11, the method further comprising defining a group of soil horizons for the geographical location, the plurality of parameters including one set of parameters for each of a plurality of soil layers, the group of soil horizons corresponding to a subset of the plurality of soil layers, the applying being performed with a reduced search space based on the group of soil horizons.

19. The non-transitory storage medium of claim 18, defining a group of soil horizons comprising: classifying the geographical location vertically into a number of thin layers, each associated with a soil layer, and merging two consecutive thin layers associated with identical or similar soil layers into a soil horizon.

20. The non-transitory storage medium of claim 18, the method further comprising identifying a correlation between two of the soil horizons for the geographical location for a second of the plurality of parameters, the applying being performed with a reduced search space for the second parameter based on the correlation.

* * * * *